Nov. 24, 1964 R. POUIT 3,157,987
INTERNAL COMBUSTION ENGINES SUPERCHARGED
BY MEANS OF A TURBO-BLOWER
Filed March 1, 1962
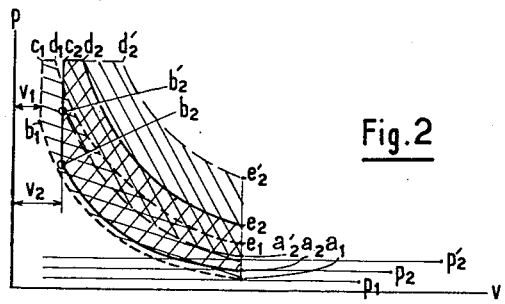
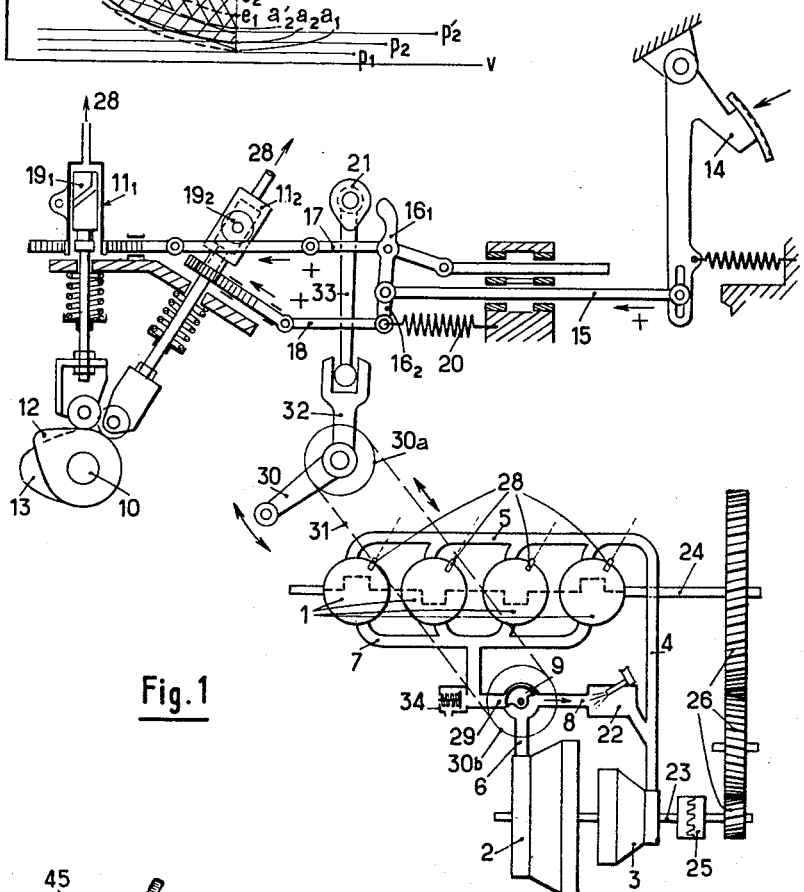
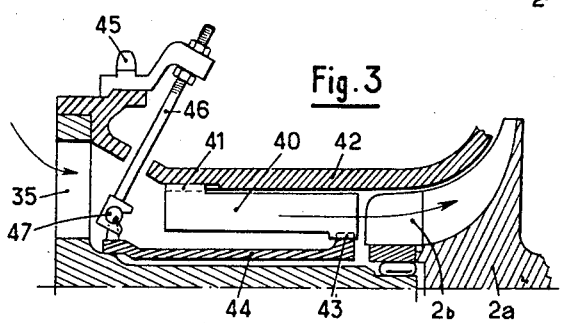
INVENTOR
ROBERT POUIT
BY *Bailey, Stephens &*
*Hustig*
ATTORNEYS

3,157,987
INTERNAL COMBUSTION ENGINES SUPERCHARGED BY MEANS OF A TURBO-BLOWER
Robert Pouit, 3 Rue Auguste Mayet, Asnieres,
Seine, France
Filed Mar. 1, 1962, Ser. No. 176,683
Claims priority, application France Mar. 11, 1961
9 Claims. (Cl. 60—13)

The present invention relates to internal combustion engines supercharged by means of a turbo-blower and it is more especially concerned with fuel injection engines of the diesel type.

The object of my invention is to provide an engine of this kind which complies with the requirements of practice better than those known up to this time, in particular concerning the adaptation of their supercharging turbo-blower to the varying speeds of operation of the engine.

My invention consists chiefly in providing a by-pass conduit between the delivery conduit of the blower and the intake conduit of the gas turbine of the turbo-blower and in varying simultaneously the amount of fuel fed to the engine and the degree of opening of a valve controlling the flow of air through said by-pass conduit, the means serving to adjust the amount of fuel fed to the engine being advantageously arranged, in the case of an engine of the diesel type, in such manner as to increase the ratio of the amount of fuel injected under constant pressure conditions to that injected under constant volume conditions when the degree of supercharging and, consequently, the torque supplied by the engine are increased, and to reduce this ratio in the inverse case.

It should be noted that the terms "under constant pressure conditions" and "under constant volume conditions" relate to the indicator card of the engine during the period of combustion of the injected fuel.

Other features of my invention will become apparent in the course of the following detailed description of a preferred embodiment thereof made with reference to the appended drawings given merely by way of example, and in which:

FIG. 1 is a diagrammatical view showing a diesel engine with its supercharging unit and the means for adjusting the injection of fuel, made according to the present invention;

FIG. 2 shows curves to illustrate the principle of this invention;

FIG. 3 shows a particular arrangement for the inflow of air into the blower.

The advantages resulting, in an internal combustion engine, from the use of a supercharger consisting of a turbo-blower operated by the exhaust gases of the engine, are well known. The chief of these advantages is a substantial increase of the engine power without any material variation either of the efficiency or of the mechanical stresses. However, to adapt the output flow rate of the continuous flow turbo-blower to the flow rate of the exhaust gases, which varies with the number of revolutions per minute of the engine, involves great difficulties as soon as the conditions of operation differ from a given set of conditions, called "adaptation conditions." As a consequence, up to now, the possible variations of the r.p.m. of the engine were limited to a narrow range. Therefore vehicles having engines of this kind had to be provided with a gear box giving a great number of different gear ratios, so that the use of such engines involved bulky and costly gear boxes which reduced the capacity of transportation of the vehicles.

The object of the present invention is to eliminate these drawbacks.

In FIG. 1 the invention is applied to a diesel engine serving to drive a vehicle, for instance a heavy vehicle, this engine comprising four cylinders 1 which are diagrammatically shown.

In order to supercharge these cylinders, I make use of a turbo-blower unit comprising a blower 2 consisting of a rotary compressor and a gas turbine 3 driven by the exhaust gases from cylinders 1, these gases being fed to turbine 3 through a conduit 4 branching off from the exhaust manifold 5 of the engine. The compressed air supplied by compressor 2 is fed to cylinders 1 through a conduit 6 which connects the output of compressor 2 to the intake mainfold 7 of the engine.

According to the main feature of my invention, I provide a by-pass conduit 8, starting from an intermediate point of the delivery conduit 6 of compressor 2 to an intermediate point of the intake conduit 4 of turbine 3, and the flow of air through this by-pass conduit 8 is controlled by means of a valve 9. This valve 9, which is located at the place where by-pass conduit 8 branches off from delivery conduit 6, makes it possible to vary the ratio to each other of the amounts of air which are directed from compressor 2 respectively toward intake manifold 7 and, through by-pass conduit 8, toward the intake conduit 4 of turbine 3. This valve 9 is controlled through means, which will be more completely described hereinafter, operatively connected with the means which control the amounts of fuel injected into the cylinders 1 of the engine.

In a diesel engine, where mention may be made of a combustion under substantially constant volume conditions (combustion of the fuel injected before the piston, or pistons, reach their inner dead center positions) and of a combustion under substantially constant pressure conditions (combustion of the fuel injected after the pistons have reached their inner dead center positions), I advantageously provide means such that the ratio of the amount of fuel injected under substantially constant pressure conditions to that injected under substantially constant volume conditions increases when the rate of supercharging and consequently the torque supplied by the engine increases, and inversely.

The effect obtained as a consequence of this main feature of the invention is illustrated by the curves of FIG. 2. Among these curves, the cycle of operation of an engine fed at a pressure equal to the external pressure $p_1$ (the dead space being $v_1$) is shown in dotted lines (compression along $a_1$, $b_1$, combustion under substantially constant volume conditions along $b_1$, $c_1$, combustion under substantially constant pressure conditions along $c_1$, $d_1$, expansion along $d_1$, $e_1$).

However in the case of a supercharged engine, the dead space should be increased from value $v_1$ to value $v_2$, and consequently the pressure at the end of the compression period, at $b_2$, becomes lower than the corresponding pressure, at $b_1$, indicated by the curve corresponding to the case where their engine is not supercharged.

On the contrary the maximum pressure, indicated by point $c_1$, may be maintained whatever be the degree of supercharging and the increase of the total amount of fuel injected into the engine (which amount of fuel must of course increase when the rate of supercharging increases), preferably by a suitable variation of the ratio of the amount of fuel injected during the period of combustion taking place practically under constant volume conditions (this period being indicated by lines $b_2$, $c_2$), to the amount of fuel injected during the period of combustion taking place practically under constant pressure conditions (this period being indicated by lines $c_2$, $d_2$ or $c_2$, $d'_2$).

FIG. 2 shows curves illustrating the cycle of the engine for two different rates of supercharging.

The first curve $a_2$, $b_2$, $c_2$, $d_2$, $e_2$ corresponds to supercharging at pressure $p_2$ and to a total amount of injected fuel in relation to this degree of supercharging. The area limited by this curve is of course greater than that limited by curve $e_1$, $b_1$, $c_1$, $d_1$, $e_1$ corresponding to no supercharging. When the supercharging pressure is increased to value $p'_2$, I obtain, at the end of the compression period, a pressure indicated by point $b'_2$, higher than that indicated by point $b_2$. In order to obtain in this last case a curve $a'_2$, $b'_2$, $c_2$, $d'_2$, $e'_2$, that is to say a curve where the maximum pressure, at $c_2$, remains unchanged I reduce according to the invention the amount of fuel (and consequently the amount of heat) introduced under constant volume conditions (line $b'_2$, $c_2$) and I increase the amount of fuel (and consequently the amount of heat) introduced under constant pressure conditions, that is to say during period $c_2$, $d'_2$. The consequence is a reduced expansion $d'_2$, $e'_2$ and therefore a higher pressure and a higher temperature of the exhaust gases of the engine, so that the work produced by turbine 3 is increased. Therefore, when the degree of supercharging increases, it is the turbine which gets the benefit of an increase of the pressure and of the temperature of the exhaust gases from the engine. Consequently the turbine supplies an excess of work to the compressor, which is accelerated, and this permits an increase of the supercharging pressure. This excess of work is such that the flow rate of the air supplied by the compressor becomes greater than that which can be absorbed by the engine which, at the time when it required an increase of the degree of supercharging in order to supply a higher torque, was simultaneously slowed down. According to the invention, the excess of air supplied by the compressor is fed through by-pass conduit 8, directly toward the intake of turbine 3. This makes it possible, by mixing the air thus by-passed with the exhaust gases of the engine, to reduce the temperature at the inlet of the turbine, which is necessary because, otherwise, the turbine might be injured and even possibly destroyed by being made to work at too high a temperature. I therefore obtain the great advantage that, despite a reduction of the speed of the engine due to an increase of the torque it must supply, its power remains at least constant without any material increase of the mechanical stresses in the engine.

Such an operation is particularly useful in the case of engines mounted on vehicles, which, when they must supply an increased torque, for instance when the vehicle is running uphill, undergo a substantial reduction of speed. By making such engines according to the main feature of my invention, it is possible substantially to reduce the number of gear ratios of the gear box interposed between the engine and the wheels of the vehicle.

Concerning now the regulating means which permit varying, according to the load of the engine, the amount of fuel injected into the engine cylinders per cycle of operation while permitting a variation of the ratio of the amount of fuel injected under substantially constant volume combustion conditions to the amount of fuel injected under substantially constant pressure combustion conditions, they may be arranged in such manner that the advance to injection is varied together with the amount of fuel that is injected. However it seems more advantageous to make use of the arrangement illustrated by FIG. 1, according to which injection takes place in two steps, the ratio of the amounts fed during these respective steps being variable in accordance with what has been stated above.

As shown by FIG. 1, I make use of two injection pumps $11_1$, $11_2$ disposed at a given angle to each other and operated by a cam 10 driven at a speed proportional to that of the engine and including two distinct projections 12 and 13 respectively. Furthermore, the fuel feed control rod 15, operated by a control part such as pedal 14, is pivotally connected to a lever having two branches $16_1$ and $16_2$ to which are themselves pivoted rods 17 and 18 which control the distribution of the fuel delivered by the pistons $19_1$ and $19_2$ of pumps $11_1$ and $11_2$ toward injectors 28. Rod 17 serves to adjust the amount of fuel fed during the first injection (combustion under substantially constant volume conditions) produced by pump $11_1$, and rod 18 serves to adjust the amount of fuel corresponding to the second injection (combustion under substantially constant pressure conditions) produced by pump $11_2$.

I first keep in fixed position the end of branch $16_2$ by means of a spring 20 having a given initial compression, so that the first action exerted on rod 15 in the direction of the arrow marked + to increase the delivery of fuel has for its effect to drive only rod 17 in the direction of this arrow +, which increases the amount of fuel injected by pump $11_1$, which is intended to burn under substantially constant volume conditions, and this until branch $16_1$ comes into contact with an adjustable cam 21 thus limiting, according to the position of this cam, the amount of fuel fed during this first injection. Further action in this direction + on control rod 15 causes rod 18 to be driven against the action of spring 20 in the direction of arrow +, thus increasing the amount of fuel injected by pump $11_2$ and which is intended to burn under constant pressure conditions during the second injection. According to the position of cam 21 it is thus possible to vary the distribution of fuel between these two injections.

According to a modification comprising only one pump 11, the adjustment elements 17 and 18 would act upon distributing means disposed between the single pump body and the injectors.

The position of cam 21 and that of valve 9 are functions of the rate of supercharging. According to my invention they are controlled simultaneously, preferably by means of a single control member such as a lever 30. This lever, on the one hand, through two toothed wheels $30_a$, $30_b$ interconnected by a chain 31, acts upon valve 9 and on the other hand, through a fork 32 and a lever 33, acts upon cam 21. Lever 30 may be operated at will either by the driver of the vehicle or by a speed governor mounted on the engine.

The device illustrated by FIG. 1 may be further completed as follows:

A discharge valve 34 may be provided on conduit 6 between valve 9 and the intake manifold 7 so as to permit the escape to the atmosphere of a possible excess of compressed air which could not be absorbed by the engine in case of a temporary closing of by-pass 8 by valve 9, this valve 34 being loaded to open for the maximum rate of supercharging.

According to a particularly advantageous feature, I provide means for varying the direction in which compresed air enters the rotor of the blower at the same time as valve 9 is being rotated and the amount of fuel injected varied.

Thus, supposing that the blower is a centrifugal blower, I reduce the differences of speed of the turbo-blower for different rates of supercharging.

FIG. 3 shows such an arrangement. The rotor of the centrifugal blower is shown at $2_a$, this rotor comprising blades $2_b$. Air enters the blower through an opening 35 but before entering rotor $2_a$ it must flow between vanes 40 of variable inclination. Preferably this variation is obtained by twisting of these vanes which are therefore made in the form of resilient plates. These plates are connected at their upstream ends to the fixed stator 42 through ribs 41 which penetrate into corresponding longitudinal grooves provided in said stator, the whole being arranged in such manner that the front edges of deformable vanes 40 extend radially. Furthermore, elements 40 are connected at their downstream ends 43 to an annular member 44 adapted to be rotated about the axis of the blower, so as to produce the desired deformation of elements 40 and the variation of the angle under which are enters rotor $2_a$, $2_b$. In order to rotate this annular member 44 about the axis of the blower, the outer end of said member is connected through a swivel joint 47 to a lever 46 actuated by means of a toothed wheel 45 mounted coaxially about the axis of the blower, so as to be rotatable about said axis. Rotation of wheel 45 may be obtained by means of a chain which may be the chain 31 of FIG. 1 or which may be operatively connected therewith.

According to the inclination of the downstream ends of vanes 40, the blades $2_b$ of the rotor are attacked by the airstream under variable angles so that for a given variation of the compression, a smaller variation of speed of the rotor is obtained. For instance whereas in the case of an ordinary blower intended to compress air with a compression ratio of 2/1, the obtainment of a compression ratio equal to 3/1 would require an increase of the speed of about 25%, in the case of a device such as shown by FIG. 3, this compression ratio of 3/1 may be obtained with an increase of the speed of rotation of only 10%, owing to a suitable variation of the direction of the airstream entering the rotor.

In many cases it will be useful to provide in by-pass conduit 8 a combustion chamber 22 in which, in case of necessity, fuel is injected and ignited. This fuel injection may serve during normal running of the engine to increase, when necessary, the temperature of the gases at the intake of turbine 3. However such a fuel injection seems to be particularly advantageous when the engine is being started, in particular at low temperatures, that is to say when self ignition in the engine cylinders is no longer ensured, due to the low ratio compression. In this case the turbo-blower is started in advance by burning fuel in chamber 22 and the engine is started only when the pressure and temperature of the supercharged air are sufficiently high.

According to another feature of the invention, I substantially increase the torque supplied by the engine when the rate of supercharging is high, i.e. when the load increases and the speed of the engine decreases, by means of a temporary mechanical coupling between the shaft 23 of the turbo-blower unit and the shaft 24 of the engine. In this way I make use of the excess of power supplied by the turbine over that capable of being absorbed by the compressor, this excess of power being higher as the temperature at the intake of the turbine and the efficiency of the turbine are themselves higher.

According to this feature of the invention I interpose, between shafts 23 and 24 a free wheel mechanism 25 and a speed reducing gear including wheels 26, the ratio of reduction being established for a given ratio of the speed of the engine under overload conditions to the speed of the turbo-blower corresponding to the rates of supercharging suitable for such an overload.

By way of example it will be supposed that the speed of the vehicle and of its engine, when the vehicle is climbing a hill, is reduced by 25% with respect to the normal running speed and for a supercharging rate of 2 kg./cm.$^2$ abs. (diagram $a_2$, $b_2$, $c_2$, $d_2$, $e_2$). The action of the driver on pedal 14 then causes an increase of the injection and modifies the distribution (relative reduction of the fuel burnt under constant volume conditions and increase of the fuel burnt under constant pressure conditions) according to the position of cam 21. Under the effect of the raise of temperature of the exhaust gases the speed of the turbine increases, which produces an increase of the supercharging pressure ($p'_2$, curve $a'_2$, $b'_2$, $c_2$, $d'_2$, $e'_2$, corresponding to an important increase of the torque with respect to that corresponding to curve $a_2$, $b_2$, $c_2$, $d_2$, $e_2$). A limitation of the speed of the turbo-blower is obtained by opening valve 9. The combined adjustments corresponding to the opening of valve 9 and the variation of the fuel injection conditions thus permit of adjusting the speed of the turbo-blower and therefore the supercharging pressure. If the load (depending for instance upon the gradient of the road along which the vehicle is running) further increases, producing a further reduction of the speed of the engine, for instance of 35% (due to the fact that it is no longer possible to increase either the fuel injection or the supercharging pressure) the free wheel mechanism is automatically engaged, thus coupling the engine with the turbo-blower, which tends to brake the turbo-blower and thus to reduce the rate of supercharging, which is prevented by a gradual closing of valve 9 which increases the temperature at the inlet of the turbine and therefore the power that is supplied at this speed. As the excess of power is transmitted through free wheel 25 and gear 26 to the engine, the torque is further increased.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, an internal combustion engine having a shaft an intake space and an exhaust space, said engine being of the diesel type and having at least one cylinder and one piston slidable therein to form therewith a working chamber where fuel combustion takes place, first fuel injection means operatively connected with said shaft for feeding fuel into said chamber during a first period where the volume of said chamber is practically constant, second fuel injecting means operatively connected with said shaft for feeding fuel into said chamber during a second period where the pressure in said chamber is practically constant, a supercharger comprising a gas turbine and an air blower coupled with said turbine, a first conduit leading from said exhaust space to the intake of said gas turbine, a second conduit leading from the output of said blower to said engine intake space, a by-pass conduit leading from an intermediate point of said second conduit to an intermediate point of said first conduit, a valve in said by-pass conduit to control the flow of air therethrough, adjusting means for varying the relative value of the amount of fuel fed by said first fuel injection means with respect to the amount of fuel fed by said second fuel injection means, and control means operatively connected on the one hand with said valve and on the other hand with said adjusting means so as to increase the relative value of the amount of fuel fed during said second period with respect to the amount of fuel fed during said first period while reducing the degree of opening of said valve, and inversely.

2. A combination according to claim 1, in which said blower is a centrifugal blower including a stator and a rotor, further comprising means for varying the direction in which external air enters said blower rotor.

3. A combination according to claim 1 further including a combustion chamber inserted in said by-pass conduit and means for feeding fuel to said chamber for combustion therein.

4. A combination according to claim 1 further comprising a spring loaded discharge valve mounted in the portion of said second conduit extending between the point where said by-pass conduit branches off therefrom and said engine manifold, said discharge valve being adapted to open to the atmosphere under a given pressure existing in said portion of said second conduit.

5. A combination according to claim 1 wherein said fuel injection means comprises two fuel injection pumps, and two cams operatively connected with said engine so as to be driven by it, said cams being mounted to cooperate with said two pumps respectively, one of said pumps being arranged to supply fuel serving to combustion practically under constant volume conditions and the other of said pumps being arranged to supply fuel serving to combustion practically under constant pressure conditions.

6. A combination according to claim 1 wherein said fuel injection means comprises two fuel injection pumps, and two cams operatively connected with said engine so as to be driven by it, said cams being mounted to cooperate with said two pumps respectively, one of said pumps being arranged to supply fuel serving to combustion practically under constant volume conditions and the other of said pumps being arranged to supply fuel serving to combustion practically under constant pressure conditions, a manual control member means, for adjusting the flow rates of said two pumps, two transmission means between said control member and said respective pump adjusting means, and a rotatable cam inserted in one of said transmission means, said rotatable cam being adapted to vary, according to its position, the ratio to each other of the respective deliveries of said pumps.

7. A combination according to claim 6 comprising a single adjustment control member operatively connected both with said last mentioned cam and with said valve located in said by-pass conduit.

8. A combination according to claim 1 further comprising transmission means interposed between the shaft of said turbine and the shaft of said engine, for transmission of power from said turbine to said engine when said engine is slowed down considerably when a very high driving torque is requested therefrom, said transmission means including a free wheel mechanism mounted to transmit movement from said turbine shaft to said engine shaft but not from said engine shaft to said turbine shaft.

9. In combination, an internal combustion engine having a shaft, an intake space and an exhaust space, said engine having at least one cylinder and one piston slidable therein to form therewith a working chamber where fuel combustion takes place, first means operatively connected with said shaft for feeding fuel into said chamber operative just before said piston has reached its inner dead center position in said cylinder, second means operatively connected with said shaft for feeding fuel into said chamber operative just after said piston has reached its inner dead center position in said cylinder, a supercharger comprising a gas turbine and an air blower coupled with said turbine, a first conduit leading from said exhaust space to the intake of said gas turbine, a second conduit leading from the output of said blower to said engine intake space, a by-pass conduit leading from an intermediate point of said second conduit to an intermediate point of said first conduit, a valve in said by-pass conduit to control the flow of air therethrough, adjusting means for varying the relative value of the amount of fuel fed by said first fuel feeding means with respect to the amount of fuel fed by said second fuel feeding means, and control means for simultaneously operating said valve and said adjusting means so as to increase the relative value of the amount of fuel fed by said second fuel feeding means with respect to the amount of fuel fed by said first fuel feeding means while reducing the degree of opening of said valve, and inversely.

References Cited in the file of this patent
UNITED STATES PATENTS

| | | |
|---|---|---|
| 2,001,843 | Kasley | May 21, 1935 |
| 2,581,902 | Bodine | Jan. 8, 1952 |
| 2,612,755 | Szczenlowski | Oct. 7, 1952 |
| 2,654,991 | Nettel | Oct. 13, 1953 |
| 2,952,968 | Lieberherr | Sept. 20, 1960 |
| 3,050,932 | Mueller | Aug. 28, 1962 |

OTHER REFERENCES

A.P.C. Application of A. Baj, Ser. No. 344,165, published May 25, 1943.